United States Patent
Hurley et al.

(10) Patent No.: US 10,783,166 B2
(45) Date of Patent: Sep. 22, 2020

(54) LIST ACCUMULATION AND REMINDER TRIGGERING

(71) Applicant: Google Inc., Mountain View, CA (US)

(72) Inventors: Fergus Gerard Hurley, San Francisco, CA (US); Robin Dua, San Francisco, CA (US); Sangsoo Sung, Palo Alto, CA (US); Andrew Tomkins, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 1417 days.

(21) Appl. No.: 14/313,459

(22) Filed: Jun. 24, 2014

(65) Prior Publication Data

US 2015/0370884 A1    Dec. 24, 2015

(51) Int. Cl.
*G06F 16/00* (2019.01)
*G06F 16/28* (2019.01)
*G06Q 10/10* (2012.01)

(52) U.S. Cl.
CPC ......... *G06F 16/285* (2019.01); *G06Q 10/109* (2013.01)

(58) Field of Classification Search
CPC ......... G06F 17/30029; G06F 17/30056; G06F 16/285; H04L 67/10; G06Q 10/109
USPC .......................................................... 707/740
See application file for complete search history.

(56) References Cited

U.S. PATENT DOCUMENTS

| | | | |
|---|---|---|---|
| 5,699,107 A * | 12/1997 | Lawler | H04N 5/44543 348/E5.105 |
| 6,169,543 B1 * | 1/2001 | Wehmeyer | H04N 5/44543 348/564 |
| 7,039,420 B2 * | 5/2006 | Koskinen | H04W 4/02 455/456.1 |
| 7,277,726 B2 | 10/2007 | Ahya | |
| 7,323,988 B2 * | 1/2008 | Krstulich | G08B 13/1427 340/539.13 |
| 7,577,522 B2 * | 8/2009 | Rosenberg | G06Q 10/109 340/539.13 |

(Continued)

FOREIGN PATENT DOCUMENTS

| | | |
|---|---|---|
| EP | 1008946 A1 | 6/2000 |
| EP | 2450841 | 5/2012 |

(Continued)

OTHER PUBLICATIONS

International Search Report and Written Opinion in International Application No. PCT/US2015/035990, dated Oct. 8, 2015, 11 pages.

(Continued)

*Primary Examiner* — Tarek Chbouki

(74) *Attorney, Agent, or Firm* — Middleton Reutlinger

(57) ABSTRACT

Methods, systems, and apparatus, including computer programs encoded on a computer storage medium, for list accumulation and reminder triggering. In one aspect, a method includes receiving, at a data processing apparatus, a first input comprising a plurality of terms; determining, by the data processing apparatus, that one or more of the terms in the first input specify an item that belongs to a reminder category, the reminder category being associated with a collection of items that belong to the category and for which reminders may be generated; and in response to the determination, storing data that associates a reminder type with the item specified by the one or more terms.

15 Claims, 12 Drawing Sheets

(56) References Cited

U.S. PATENT DOCUMENTS

| | | | |
|---|---|---|---|
| 8,054,180 B1 | 11/2011 | Scofield et al. | |
| 8,321,916 B2 | 11/2012 | Aissi | |
| 8,326,279 B2 | 12/2012 | Aftab | |
| 8,594,641 B2* | 11/2013 | Neilsen | H04M 1/72566 455/412.2 |
| 8,666,367 B2* | 3/2014 | Sharp | G06F 9/4843 342/357.4 |
| 2002/0116541 A1* | 8/2002 | Parker | G06F 15/02 719/318 |
| 2006/0145850 A1* | 7/2006 | Krstulich | G08B 13/1427 340/572.1 |
| 2006/0195518 A1* | 8/2006 | Neilsen | H04M 1/72566 709/204 |
| 2008/0091931 A1* | 4/2008 | McNutt | G05B 19/054 713/1 |
| 2009/0119716 A1* | 5/2009 | Ellis | H04N 5/44543 725/58 |
| 2009/0254944 A1* | 10/2009 | Watson | H04M 19/04 725/58 |
| 2010/0026526 A1* | 2/2010 | Yokota | G08G 1/096827 340/996 |
| 2011/0202495 A1* | 8/2011 | Gawlick | A61B 5/0002 706/59 |
| 2012/0242482 A1* | 9/2012 | Elumalai | G06Q 10/109 340/539.13 |
| 2013/0073449 A1* | 3/2013 | Voynow | G06Q 30/0601 705/39 |
| 2014/0070945 A1* | 3/2014 | Dave | G08B 21/24 340/540 |
| 2014/0114716 A1 | 4/2014 | Flogel | |
| 2014/0172953 A1* | 6/2014 | Blanksteen | H04W 4/02 709/203 |
| 2014/0206328 A1* | 7/2014 | Varoglu | H04W 4/028 455/418 |
| 2015/0066479 A1* | 3/2015 | Pasupalak | G06F 17/27 704/9 |

FOREIGN PATENT DOCUMENTS

| | | |
|---|---|---|
| EP | 2587746 | 4/2016 |
| JP | H11-143936 | 5/1999 |
| JP | 2004-534340 | 11/2004 |
| JP | 2007-58660 | 3/2007 |
| WO | WO 2003/007204 | 1/2003 |
| WO | WO 2007/064496 | 6/2007 |
| WO | WO 2011/088053 | 7/2011 |
| WO | 2013/155619 | 10/2013 |

OTHER PUBLICATIONS

"Reminders in Google Now," [online][Retrieved on May 28, 2014]; Retrieved from the Internet URL: https://support.google.com/websearch/answer/3122344?hl=en, 2014, 6 pages.

"Remote Alarm Clock," [online][Retrieved on Mar. 26, 2014]; Retrieved from the Internet URL: https://play.google.com/store/apps/details?id=com.greatbytes.remotealarmclock, 2013, 3 pages.

"Remote API (RAPI)," [online][Retrieved on Mar. 26, 2014]; Retrieved from the Internet URL: http://msdn.microsoft.com/en-us/library/aa920177.aspx, 2010, 2 pages.

India Intellectual Property Office: Examination Report Issued for Application No. 201647044106 dated May 11, 2020.

\* cited by examiner

LIST ACCUMULATION AND REMINDER TRIGGERING

BACKGROUND

The advent of cloud based services, search engines, and other services and media has drastically expanded the utility of user devices over the last decade. Many user devices, especially mobile devices and smart phones, now provide services and applications in addition to voice and data access. Furthermore, with the recent advent in speech-to-text processing systems, many users now want fluid and intuitive user experiences with their user devices.

Many of these application services available to users are instantiated by use of command inputs. One such service is the setting of reminders. For example, a user may speak (or type) the input [remind me to buy milk this evening] into a smart phone, and the smart phone, using a command parsing application (or, alternatively, communicating with a command parsing service) will invoke a reminder process that may solicit additional information from the user. Such information may be a time, if the user desires to be reminded at a certain time, or a location, if the user desires to be reminded when the user arrives at the location.

While the setting of such reminders is very useful is a relatively fluid user experience, the users must specify a time or location, and in the case of the latter, the user may be required to search for a particular location, such as the address of a grocery store.

SUMMARY

This specification relates to list accumulation and reminder triggering for user devices.

In general, one innovative aspect of the subject matter described in this specification can be embodied in methods that include the actions of receiving, at a data processing apparatus, a first input comprising a plurality of terms; determining, by the data processing apparatus, that one or more of the terms in the first input specify an item that belongs to a reminder category, the reminder category being associated with a collection of items that belong to the category and for which reminders may be generated; and in response to the determination, storing data that associates a reminder type with the item specified by the one or more terms. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Implementations of the subject matter described below allows for a very fluid and intuitive user experience when creating reminders. The identification of an item that belongs to a particular category, such as a grocery item that belongs to a grocery category, or a movie item that belongs to a movie category, allows for the selection of reminder types particular to the corresponding category. In many situations this frees the user from having to specify a particular time or search for a particular location for a reminder trigger. Instead, reminder triggers may be automatically selected based on the item and category, or, alternatively, may be provide to the user for confirmation. This reduces the time and effort required by the user to set a reminder, and can, in some implementations, accomplish the setting of a reminder, or creating a list items subject to the reminder, by the utterance of only a short sentence.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A reminder processing system facilitates the automatic generation of a list of items and actions that are subject to reminders of particular reminder types. In operation, the reminder processing system receives an input set of terms. The terms are parsed and compared to a set of reminder category data, such as category dictionaries. When the input includes terms that specify an item that belongs to a reminder category, the systems stores data that associates a reminder type with the item specified by the one or more terms. The reminder type specifies a triggering event, and may vary on the item and category. For example, grocery items that belong to a grocery category may have a "when" type reminder that specifies a time for a reminder, or a "where" type reminder that specifies a grocery store or a set of grocery stores. Conversely, a movie item, such as a movie title, may have "release" type reminders that each specifies a different release date.

To illustrate, a user may utter [buy green beans, bread, and milk], and in response a reminder may be set to trigger a reminder list for green beans, bread and milk when the user enters any grocery store (or a particular store that can be specified at the option of the user). Likewise, a user may utter [go see Godzilla], and in response a reminder may be set to trigger a reminder to go see the movie Godzilla on the day of its theatrical release (or some other release, such as an on-demand or streaming release after a theatrical release).

Reminders may also be subject to complex triggering. For example, a user may state [Call my wife only if I go to the Fresh Grocery Store], where the "Fresh Grocery Store" is a particular grocery store. Thus, when user goes to a grocery store and a grocery item reminder list is triggered, the reminder list will also include a reminder for the user to call his wife only if the grocery store is the Fresh Grocery Store. Likewise, a user may utter [Watch Daily Report only if home], and a reminder to watch the program Daily Report will trigger when the program begins and only if the user is home.

The reminder processing system can be implemented in the user device, or in a computer system separate from user device, such as a server system. In the case of the latter the server system receives input from the user device and sends data to the user device for processing and setting reminders. These features and additional features are described in more detail below.

Figure 1:
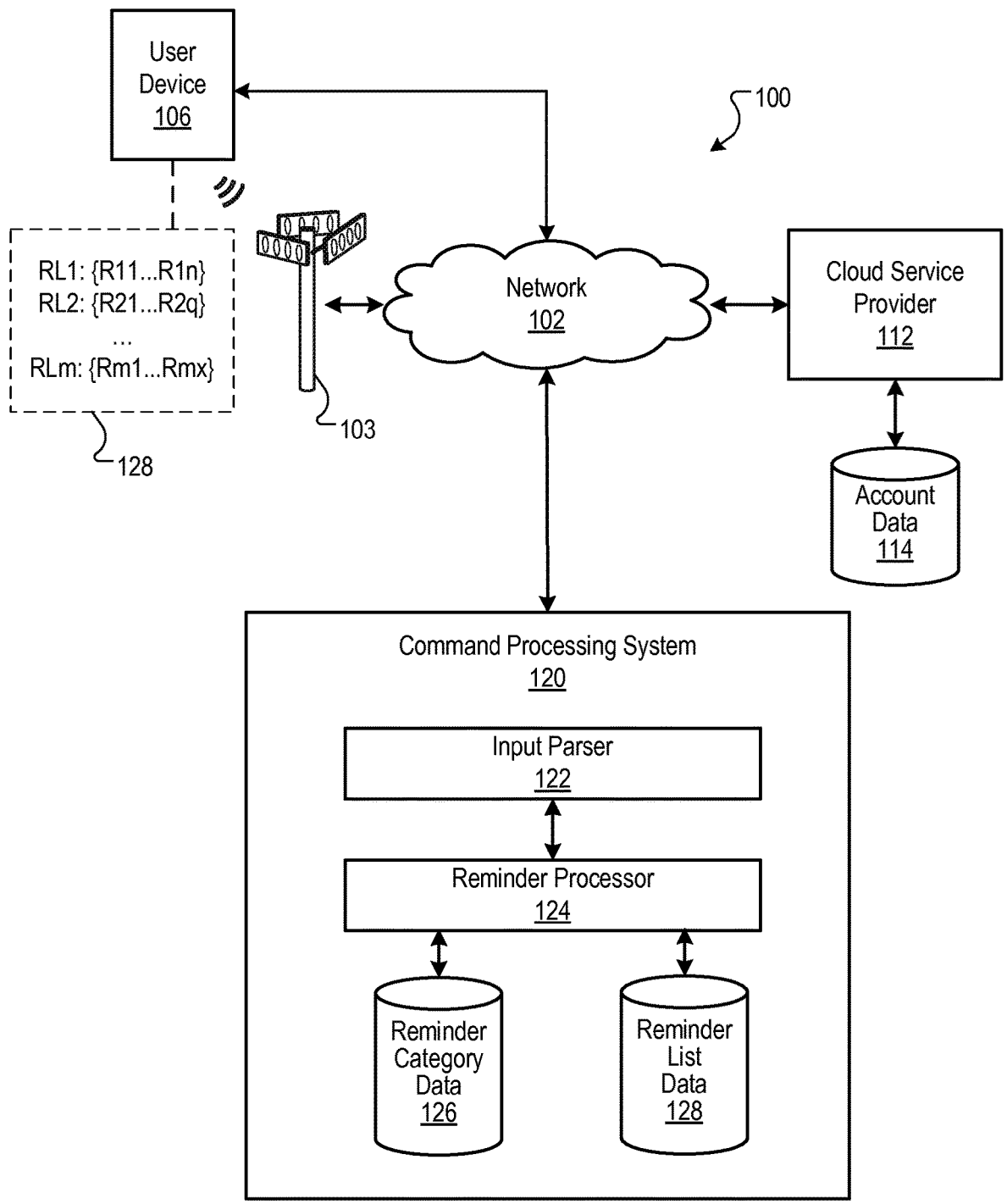
FIG. 1 is a block diagram of an environment in which command inputs are processed for list accumulation and reminder triggering.

FIG. 1 is a block diagram of an environment 100 in which in which command inputs are processed for list accumulation and reminder triggering. A computer network 102, such as the Internet, or a combination thereof, provides for data communication between electronic devices and systems. The computer network 102 may also include, or be in data communication with, one or more wireless networks 103 by means of one or more gateways.

User device 106 is an electronic device that is under the control of a user and are capable of requesting and receiving resources over the network 102, establishing communication channels, e.g., voice communications, with other user devices, and also capable of performing other actions. Example user devices 106 include personal computers, mobile communication devices, and other devices that can send and receive data over the network 102. In the example of FIG. 1, the user device 106 is a smart phone. An example smart phone is described with reference to FIG. 8 below. The user device 106 may communicate over the networks 102 and 103 by means of wired and wireless connections with the networks 102 and 103.

As described with reference to FIG. 8, a user device may be able to perform a set of device actions for various programs and capabilities. In some implementations, the user device 106 utilizes a voice recognition system that receives voice input, performs language recognition processing, and parses the resulting recognized words and phrases. The parsed words and phrases are then processed to determine whether the voice input invokes a particular action or command. A voice recognition and language processing system is not necessary, however, as the devices can also receive textual command inputs as well.

The user device 106 is associated with a user account, such as an account hosted by a cloud service provider 112 that provides multiple services. These services may include web mail, social networking, messaging, documents storage and editing, etc. The account data 114 may store data specific to the account of the user device 106.

A command processing system 120 receives command inputs from user devices and processes the command inputs to determine which, if any, actions are to be taken in response to a command input. While the command processing system 120 is shown as a separate entity in FIG. 1, the command processing system 120 can be implemented in the cloud service provider 112, or even in the user device 106.

Inputs may invoke various actions, as determined by the command processing system 120. For example, an input may be interpreted as a search query command, in which case a search query is sent to a search service. Likewise, an input may be interpreted as a command to place a phone call, in which case the user device 106 attempts to establish a voice communication over the network 103. Likewise, an input may be interpreted as a reminder, in which case reminder item may be generated. The generation of reminder items and the processing of such items are described in more detail below.

In some implementations, each input is processed by an input parser 122, which is programmed to parse the input terms and determine what actions, if any should be taken. In some implementations, the input parser 122 may access language models to determine which commands or actions to take. Such language models may be statistically based, e.g., models may include weights assigned to particular words and phrases that are determined to be semantically relevant to a particular command, or rule-based, e.g., grammars that describe sentence structures for particular commands. A variety of other language and text input processing systems may be used.

As described above, a user may input a command on the user device 106, and the command processing system 120 processes the command input to determine whether the command input resolves to a user device action that the user device is configured to perform. For the remainder of this document, the example inputs that are processed will resolve to reminder-based inputs. Accordingly, descriptions of other command processing features for other command input types are omitted.

In some implementations, the command processing system 120 includes a reminder processor 124 that communicates with the input parser 122. The reminder processor 124 also accesses reminder category data 126 and reminder list data 128. The reminder category data 126, in some implementations, may be a collection of category dictionaries. Each dictionary corresponds to a particular category and is associated with a collection of items that belong to the category and for which reminders may be generated. For example, a "Grocery" category may be associated with a list of grocery and food items; a "Movie" category may be associated with a list of movies, actors, and the like; and so on. A variety of different categories and items belonging to the categories may be stored in the category data 126. For simplicity, only two category examples—Groceries and Movies—are used to provide a contextual example of system features.

Each reminder category and item may also be associated with a corresponding set of reminder types. A reminder type is a type of reminder that triggers according to a particular event specific to that type. For example, a "where" type reminder is a reminder that triggers when the user device is at a location specified by the reminder; a "time" type reminder is a reminder that triggers when the time specified by the reminder occurs. In general, a reminder type is dependent on the type of event that triggers it. For movies, for example, reminder types may be based on particular release types, such as a release date for a theatrical release, another release date for an on-demand release, and so on.

Reminder types can be one-time or recurring. A one-time event occurs only once and will not occur again unless reset by the user. For example, a particular time event—such as a theatrical release—may only occur on the date of the release.

Likewise, a particular location event—such as a when arriving at a store—may only occur when the user first arrives at the store, and will not occur should the user revisit the store. A recurring event, however, may occur periodically or each time an action happens. For example, a particular time event—such as the weekly air time of a series—may occur each time an episode of a series airs. Likewise, a particular location event—such as a when arriving at a store—may be specified by the user as recurring so that each time the user arrives at the store, a corresponding reminder is triggered.

Because some reminders are specific to items and categories, some reminders that are associated with particular items and categories are not associated with other items or other categories. For example, the Grocery category items are not associated with a "Theatrical Release Date" time type reminder. Likewise, movie items are not associated with a "When at Grocery Store" location type reminder.

The reminder list data 128 stores an association of reminder types with items. In the case of the server side processing, the reminder list data 128 may store associations for multiple users; conversely, in the case of user device side processing, the reminder list data 128 may store associations for only the user of the user device 106. For example, the phantom reminder list data 128 connected to the user device 106 indicates the user device has multiple reminder lists RLm, each of which includes a number of reminders {R1m . . . Rmx}. The reminder processor 128 updates and maintains the list data 128, and generates reminders for the user device 106 when an event corresponding to one of reminder types occurs.

Figure 2A:
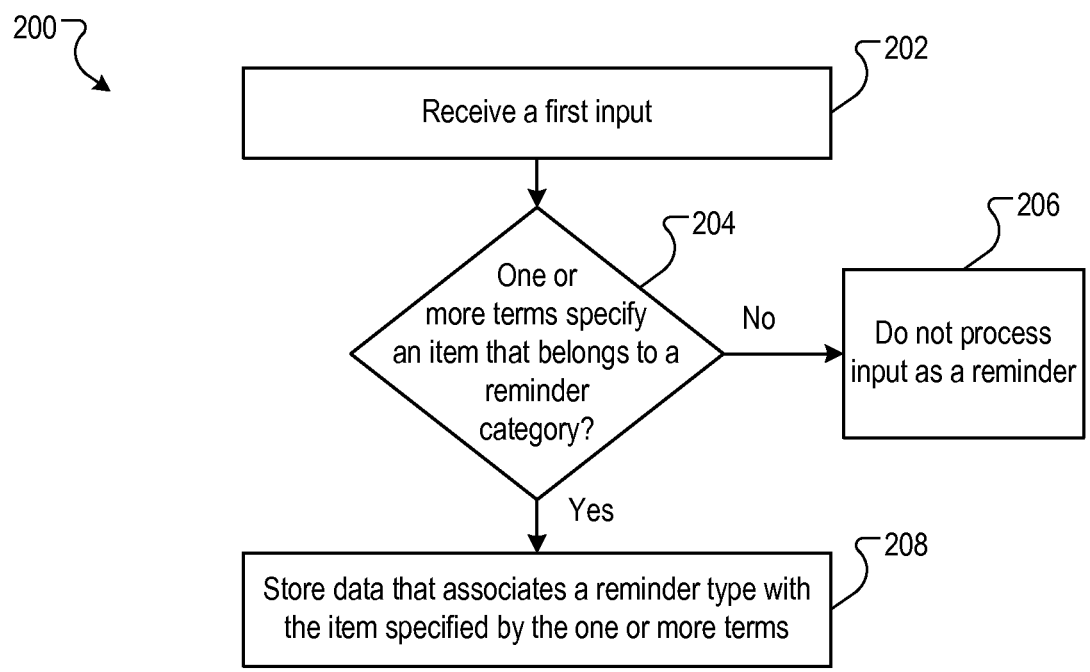
FIG. 2A is a flow diagram of an example process for generating a triggered reminder list.

Operation of the reminder processor is described with reference to FIGS. 2A, 2B, 4 and 6 below. In particular, FIG. 2A is a flow diagram of an example process 200 for generating a triggered reminder list. The process 200 can be implemented in a computer device in which the reminder processor 120 is running. In some implementations, the reminder processor 120 can be implemented in the user device 106; in other implementations, the reminder processor 120 can be running on a server in data communication with the user device 106. For example, the cloud service provider 112 may run the reminder processor 120 on a server in the cloud that communicates with the user device 106 over the networks 102 and/or 103, and which receives queries from the user device and provides data in response. Processes 220, 400 and 600, described below, can also be implemented in user devices or server-side devices.

The process 200 receives a first input (202). For example, the input parser 122 receives an input having one or more terms.

The process 200 determines whether one or more terms of the first input specify an item that belongs to a reminder category (204). For example, the parser 122 parses the terms of the input to generate parsed terms, and compares the parsed terms to reminder category dictionaries. Each reminder category dictionary corresponds to a reminder category different from each other reminder category and stores terms describing items that belong to the category. If terms of the input match terms that describe an item in one of the reminder category dictionaries, then the reminder category to which the dictionary corresponds is selected. For example, for the input [buy green beans], the terms [green beans] match a grocery item.

In some implementations, the input may be further processed, e.g., by the use of language models, grammars, etc., to determine whether the input relates to a reminder or some other action. For example, grammars may be mapped to particular actions. A grammar that parses to [vitamins in green beans], e.g., S→Vitamins in <Grocery Item non-terminal> may map to a search query input action for which the input is submitted to a search engine as input. Conversely, a grammar that parses to [buy green beans], e.g., S→<Purchase non-terminal> <Grocery Item non-terminal> may map to a reminder action for the Grocery category.

Other language models can also be used. For example, semantic analysis of the input may be used to score various actions, and the action with the highest score may be selected.

If the process 200 does not determine that one or more terms of the first input specify an item that belongs to a reminder category, then the process 200 does not process the input as a reminder (206). The input, however, may be processed according to an operation or action, e.g., as a search query input, as a command to place a phone call, etc.

Conversely, if the process 200 does determine that one or more terms of the first input specify an item that belongs to a reminder category, then the process 200 stores data that associates a reminder type with the item specified by the one or more terms (208). For example, the input parser 122 may invoke the reminder processor 124, which accesses the reminder dictionaries in the reminder category data 126. Depending on the reminder category and the item, a reminder type for the item may be associated with the item and stored in the reminder list data 128.

The storage may occur automatically according to default parameters, or may be subject to user conformation. In the case of the former, for example, a default reminder type may be selected based on the item and category. For example, for a grocery item, the default reminder type may be a "where" type that triggers when the user enters any grocery store. Conversely, for a movie item, the default reminder type may be a "time" type, and may further be a sub-type that triggers on the theatrical release date (or the next upcoming media release date if the theatrical release date has passed).

The reminder processor 124 may implement more complex automatic selection logic of reminder types. For example, a reminder type may be selected based on an event that is most likely to occur or most near in time. For example, suppose the input is [see Godzilla], and that the theatrical release date for the movie Godzilla has passed. If the movie, however, is still in many theaters, then a where type reminder for any theater location in which the movie is playing may be associated with the movie item. Conversely, if the movie is out of theaters, but a media release is scheduled, e.g., Blu-Ray, then a time type reminder for the Blu-Ray release may be scheduled. By way of another example, if the movie has been released and is still in many theaters, then a where type reminder and a time type reminder may be associated with the item. The where type reminder may be for any theater location in which the movie is playing, and the time type reminder may be for a Friday evening at 6:00 to remind the user just as a weekend begins.

Figure 2B:
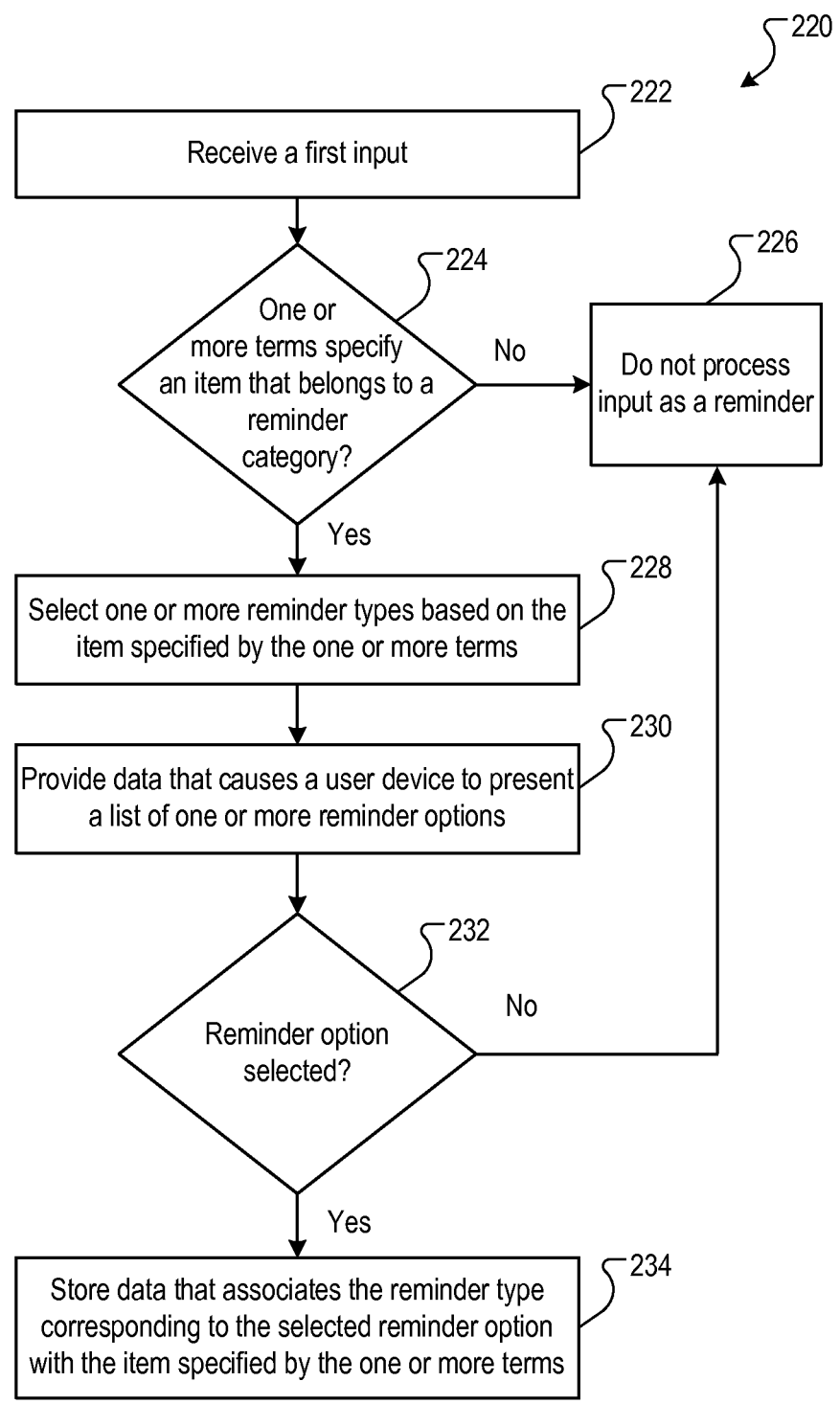
FIG. 2B is a flow diagram of another example process for generating a triggered reminder list.

In the case of user confirmation, a user interface dialog may be presented to the user for confirmation and selection of reminder types. FIG. 2B is a flow diagram of another example process 220 for generating a triggered reminder list. The process 220 is subject to user confirmation, and is also described in the context of FIGS. 3A and 3B. In particular, FIG. 3A is an illustration of a user interface 302 at a user device 300 in which a reminder for an item belonging to a first category of Groceries is presented for confirmation, and FIG. 3B is an illustration of a user interface 332 at a user device 330 in which a reminder for an item belonging to a second category of Movies is presented for confirmation.

Process steps 222, 224 and 226 are similar to process steps 202, 204 and 206 described above. Thus, the description of FIG. 2B begins at process step 228, in which the reminder processor 124 select one or more reminder types based on the item specified by the one or more terms of the input, and then provides data that causes a user device to present a list of one or more reminder options (230).

Figure 3A:
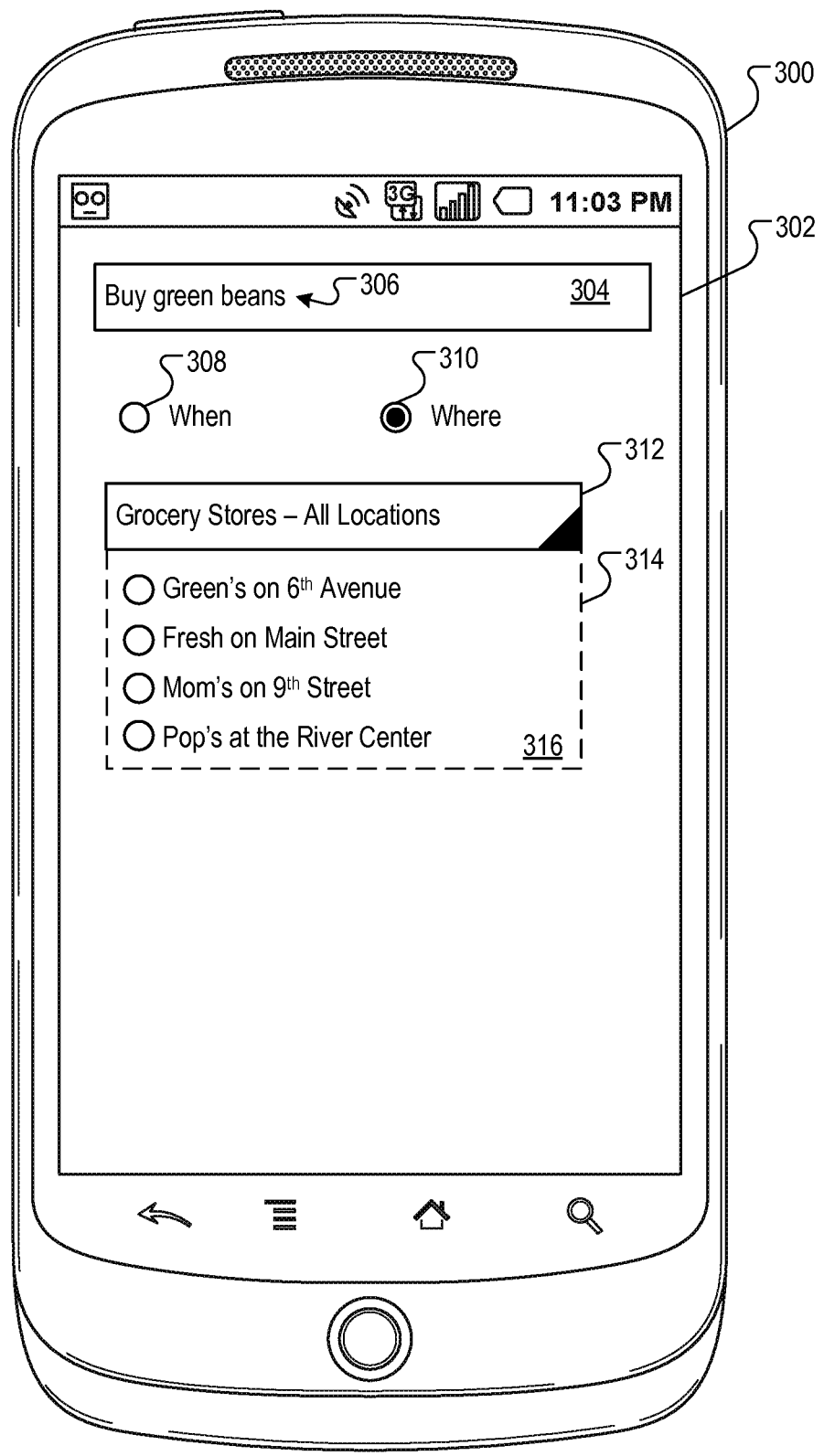
FIG. 3A is an illustration of a user interface at a user device in which a reminder for an item belonging to a first category is presented for confirmation.
Figure 3B:
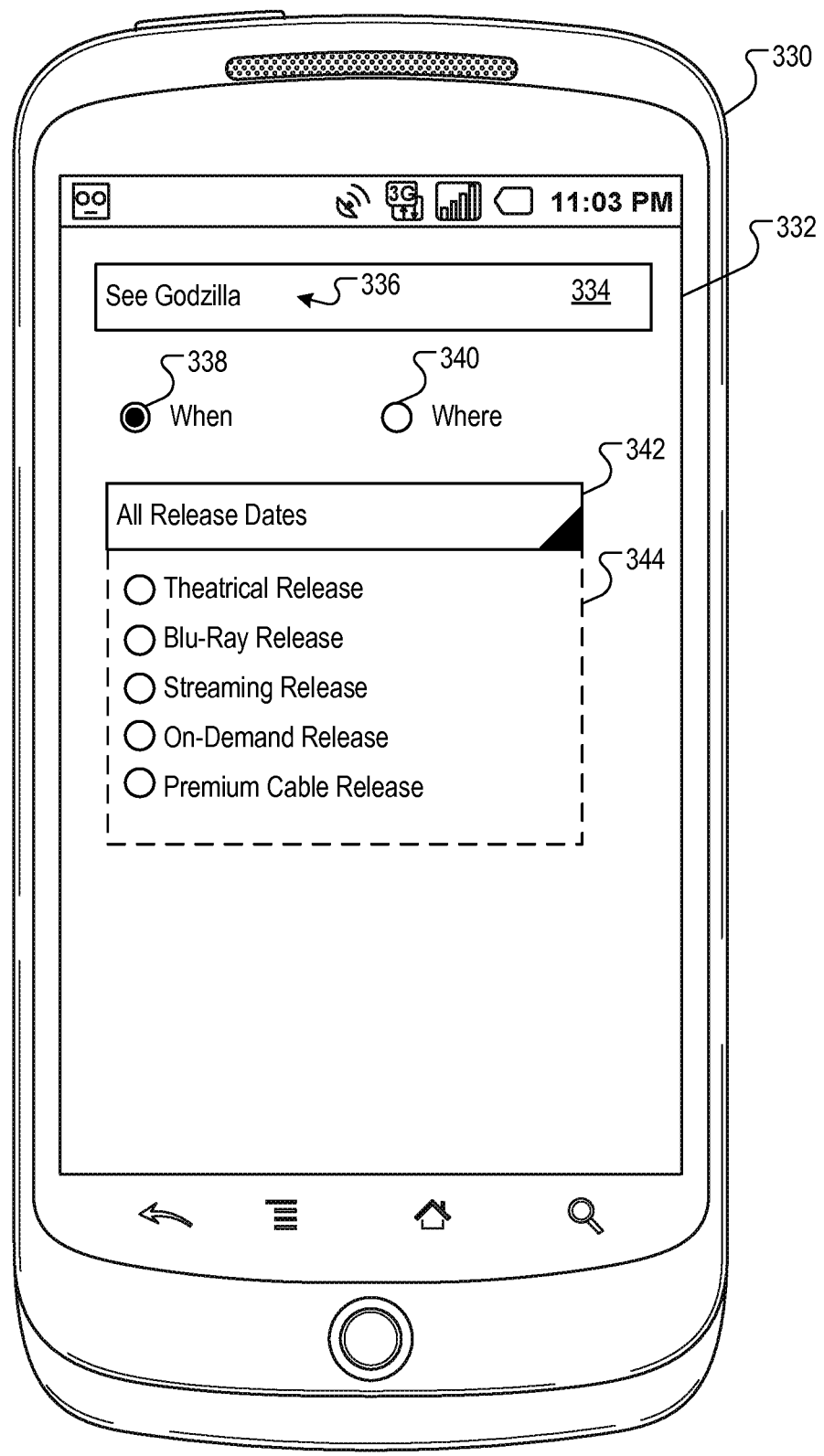
FIG. 3B is an illustration of a user interface at a user device in which a reminder for an item belonging to a second category is presented for confirmation.

For example, in FIG. 3A, for the input 306 [buy green beans] shown in the input field 304, a "where" type reminder 310 is automatically selected by the reminder processor 124 and presented to the user. The default location is "Grocery Stores—All Locations" as indicated in the menu item 312. This where type will trigger a reminder to "buy green beans" when the user device enters any grocery store. The determination of the location of the user device can be done, for example, by GPS coordinates or any other appropriate process. The location can then be compared to various grocery store locations.

The user may also select a particular store location, as indicated by the phantom list 314. For example, a user may have a particular store in mind for particular non-staple items; conversely, for staple items, the user may not care which grocery store he or she frequents. If a particular location is selected, then the reminder will only trigger when the user is at that location.

The user may alternatively select a different reminder type, such as the when type 308. Additional inputs may be required after selection of the when type 308, such as a user specified time.

In another, in FIG. 3B, for the input 306 [See Godzilla] shown in the input field 334, a "when" type reminder 338 is automatically selected by the reminder processor 124 and presented to the user. The default reminder is "All Release Dates" as indicated in the menu item 342. This time type will trigger a reminder at the occurrence of each release date, or until the user clears the reminder. The determination of release dates can be made by resolving the movie item, e.g., the movie Godzilla to an entry in a database of movie information provided by a third party.

The user may also select a release date, as indicated by the phantom list 344. For example, a user may desire to see the movie only after it is released in an "On Demand" format, and the user will be reminded when that release date occurs.

The user may alternatively select a different reminder type, such as the where type 340. Additional inputs may be required after selection of the where type 340, such as locations of specific theaters.

In some implementations, the reminder processor 124 may accesses data in dictionary describing eligible reminder types and ineligible reminder types. An eligible reminder type is a reminder type for which an event may still occur; conversely, an ineligible reminder type is a reminder type for which an event has occurred and will not occur again, or for which an event cannot occur. For example, for a movie item for which a theatrical release has already occurred, or for which there will be no theatrical release, the reminder type for "Theatrical Release" will be determined to be ineligible. The reminder processor 124 then selects only eligible reminder types for presentation.

The process 220 determines whether a reminder option is selected (232). The user may not always select a reminder option. For example, a user's input may not be well formed, and thus falsely trigger a reminder, or the user may decide to not store a reminder. If the reminder option is not selected, then the input is not processed as a reminder (226). Conversely, if a reminder option is selected, then the process 220 stores data that associates the reminder type corresponding to the selected reminder option with the item specified by the one or more terms (234). A reminder of a particular type for a particular category item is then set for the user device 106.

Figure 4:
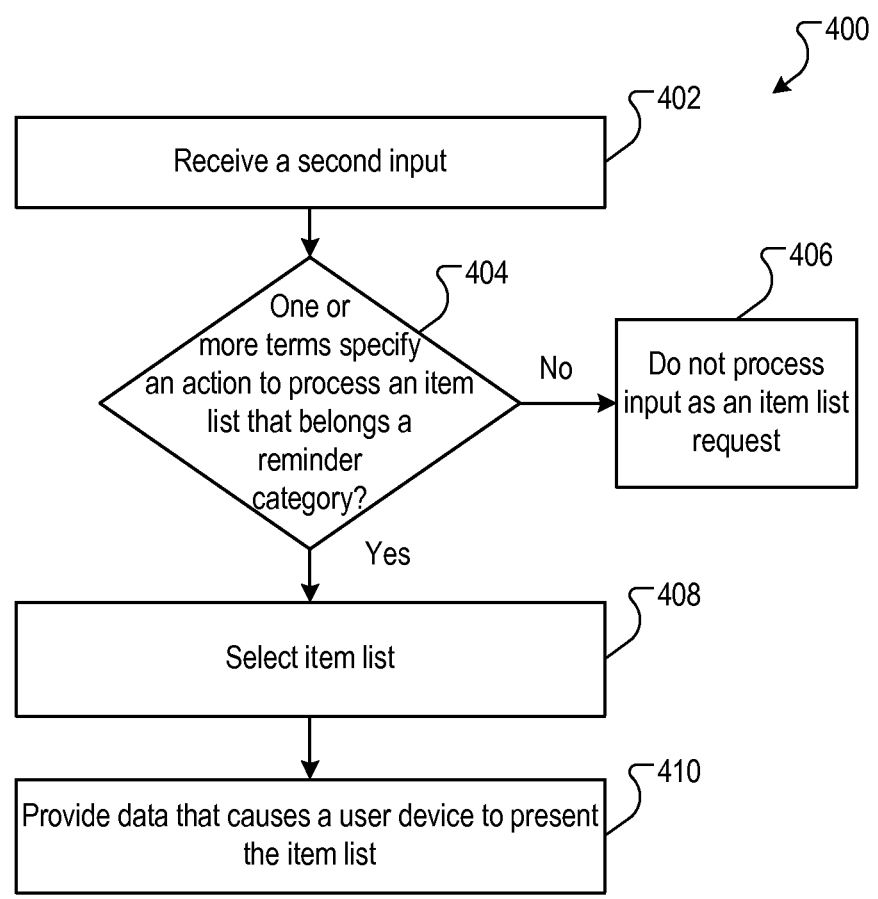
FIG. 4 is a flow diagram an example process for selecting a reminder list.
Figure 5A:
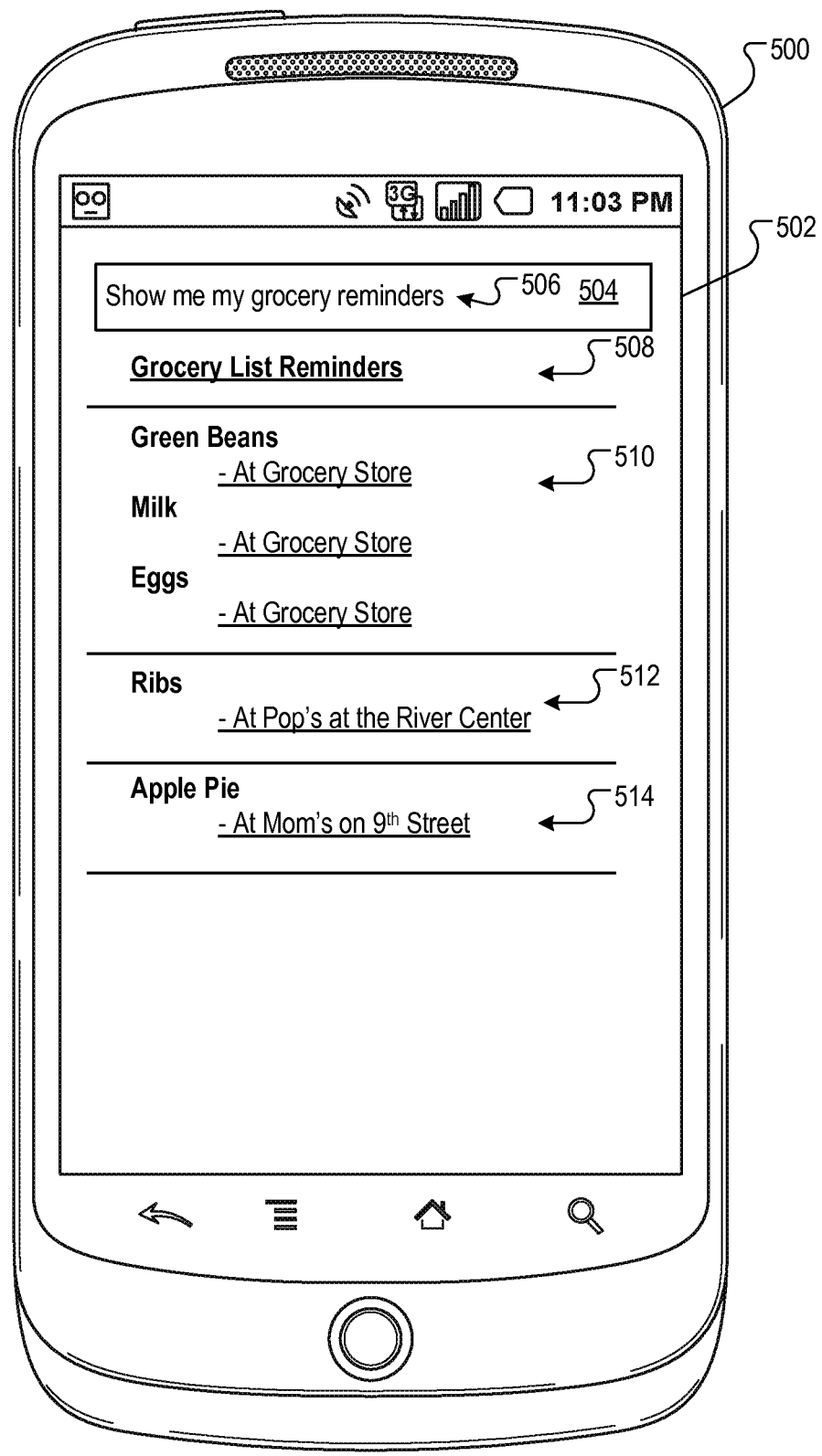
FIG. 5A is an illustration of a user interface at a user device in which a reminder list for item belonging to a first category is presented.
Figure 5B:
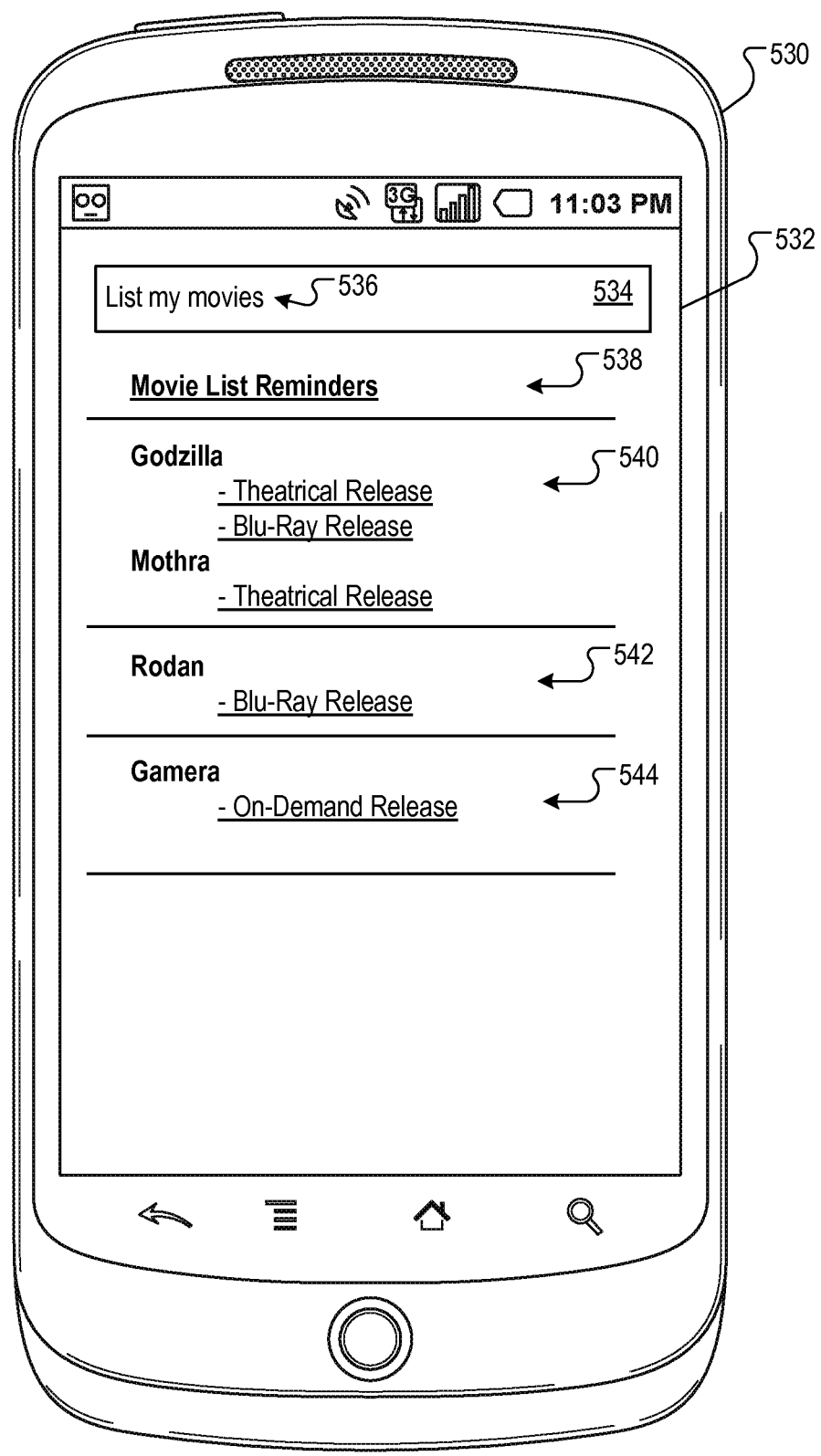
FIG. 5B is an illustration of a user interface at a user device in which a reminder list for item belonging to a second category is presented.

As a user generates reminders for items, the items and reminders may be collected according to the categories and presented in the form of reminder lists. For example, a user may input a command that, when parsed, resolves to an action to display a particular item list and corresponding reminders. FIG. 4 is a flow diagram an example process 400 for selecting a reminder list. The process 400 is described with reference to FIGS. 5A and 5B. In particular, FIG. 5A is an illustration of a user interface 502 at a user device 500 in which a reminder list for item belonging to a first category of groceries is presented, and FIG. 5B is an illustration of a user interface 532 at a user device 530 in which a reminder list for item belonging to a second category of movies is presented.

The process 400 receives a second input (402). For example, the input parser 122 receives an input having one or more terms.

The process 400 determines whether one or more terms specify an action to process an item list that belong to a reminder category (404). For example, the parser 122 parses the terms of the input to generate parsed terms, and processes the terms to determine whether the input specifies an action to process an item list that belongs to the reminder category. For example, the parsed terms may be processed using grammars or language models to determine whether the input invokes a display action. For example, the inputs [show me my grocery reminders] and [list my movies] of FIGS. 5A and 5B, respectively, may be parsed and the reminder processor 124 may determine that the input respectively invoke actions to display an item list for grocery reminders and an item list for movie reminders, respectively.

If the process 400 determines that the input does not specify an action to process an item list that belongs to a reminder category, then the input is not processed as an item list request (406). The input, however, may be processed according to an operation or action, e.g., as a search query input, as a command to place a phone call, etc.

Conversely, if the process 400 determines that the input does specify an action to process an item list that belongs to a reminder category, then an item list is selected (408) and data that causes a user device to present the item list is provided (410). For example, as shown in FIG. 5A, the input 506 [show me my grocery reminders] results in data being provided to the user device, e.g., generated by the user device 106 if the process 400 is implemented in the user device, or sent by a server is the process 400 is implemented by a service provide 112, that causes the user device to display the grocery item list 508. In some implementations, when an item list has different reminder type for the items, the items may be grouped according to the reminder types, as shown by item list groupings 510, 512, and 514. Other appropriate ways of presenting the item list can also be used.

In the first grouping 510, the reminders will be provided for the items when a user enters any grocery store. In the second grouping 512, the reminder for the item will only be provided when the user enters the grocery store "Pop's." In the third grouping 514, the reminder for the item will only be provided when the user enters the grocery store "Mom's."

By way of another example, as shown in FIG. 5B, the input 5e6 [list my movies] results in data being provided to the user device that causes the user device to display the movie item list 538. Again, the items may be grouped according to the reminder types, as shown by item list groupings 540, 542, and 544. In the first grouping 540, the item has two different reminders—theatrical release and Blu-Ray release, and reminder will be provided for the item for each release. In the second grouping 542, the reminder for the item will only be provided for the Blu-Ray release. In the third grouping 544, the reminder for the item will only be provided for the on-demand release.

Again, other appropriate ways of presenting the item list can also be used. For example, a user may provide the input [show me my theatrical release movies]. The reminder processor 124, by applying appropriate language models or grammars, will determine that the parsed terms of the second input specify a first reminder type—"theatrical release"—in addition to a category and/or item. In response, the reminder processor 124 will provide data that causes the user device to present the item list where each of the items in the list is associated with the first reminder type. In this example, only the movie items Godzilla and Mothra would be displayed.

Various other reminder type logic can also be processed. For example, a user may input [list all my groceries but Pop's]. Using semantic language models, the reminder processor 124 would determine that grocery reminders for the where reminder set to "Pop's" would not be shown. Accordingly, only the groupings 510 and 514 of FIG. 5A would be shown.

By way of another example, a list of items having related triggers can also be shown. The list can be generated from items from different categories, but where the items have a common reminder type specified by an input. For example, a user may input [Show me what I need to do tomorrow]. The term "tomorrow" is parsed to a specific date, and reminders of a "when" type that occur on that date are then shown, e.g., a grocery list, a movie, and laundry reminder may be shown. Likewise, a user may input [What do I need to do while I am in San Francisco]. In response, an item list that lists reminders for items associated with a "where" type reminder having a location of "San Francisco" is shown.

Figure 6:
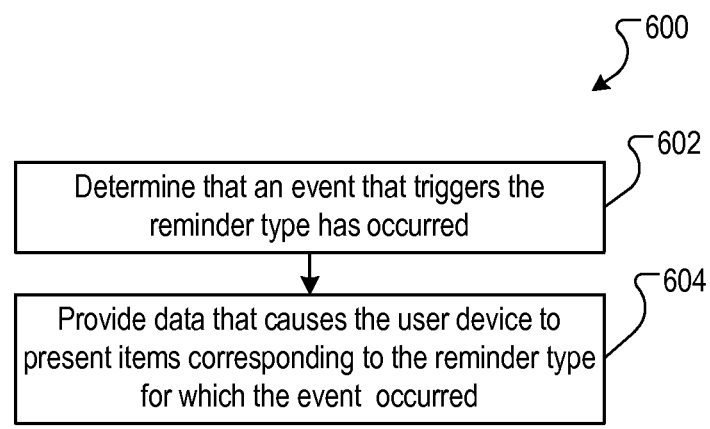
FIG. 6 is a flow diagram of an example process for presenting a list of items in response to the triggering of a reminder event.
Figure 7A:
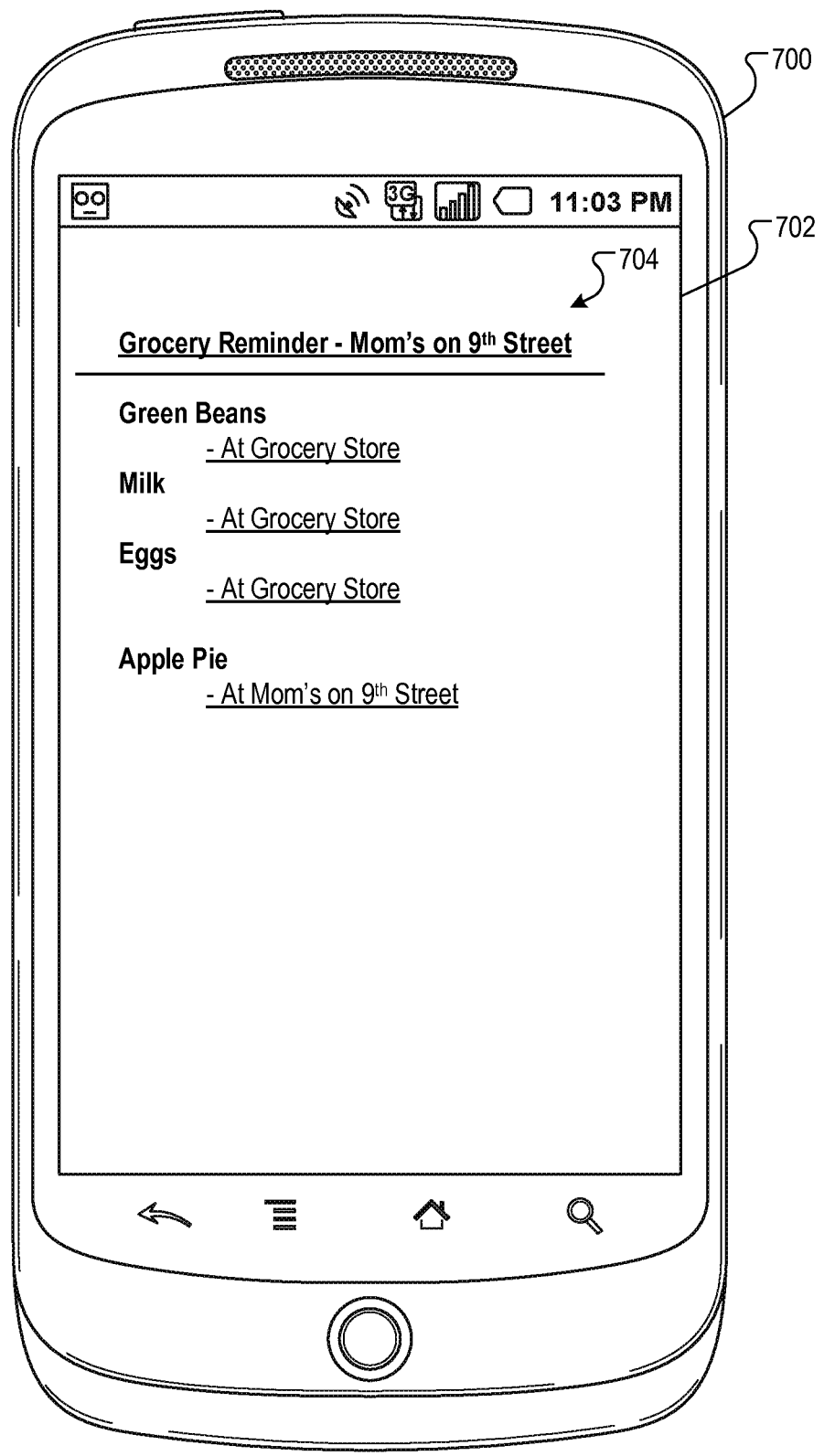
FIG. 7A is an illustration of a user interface at a user device in which a list of items in response to the triggering of a reminder event for a first reminder type is displayed.

For each item in the reminder list, the reminder processor 124 determines whether an event that satisfies the reminder type for that item has occurred. Upon the occurrence of such an event, the reminder for that item is shown. FIG. 6 is a flow diagram of an example process 600 for presenting a list of items in response to the triggering of a reminder event. The process 600 is described in the context of FIGS. 7A and 7B. In particular, FIG. 7A is an illustration of a user interface 702 at a user device 700 in which a list of items in response to the triggering of a reminder event for a first reminder type—being at the location of a particular grocery store—is displayed. Likewise, FIG. 7B is an illustration of a user interface 732 at a user device 730 in which a list of items in response to the triggering of a reminder event for a second reminder type—a theatrical release date—is displayed.

The process 600 determines that an event that triggers the reminder type has occurred (602). For example, the reminder processor 124, for each event type, collects data related to the event type, such as a current location, a current time or date, etc., and determines if any of the events for a reminder type has occurred.

When an event for a reminder type has occurred, the process 600 provides data that causes the user device to present items corresponding to the reminder type for which the event occurred (604). For example, with reference to FIG. 7A, the user has entered "Mom's" grocery store. Accordingly, reminders for the items listed in FIG. 5A, the event satisfies the reminders in groups 510 and 514. Thus the list of reminders 704, which corresponds to the reminders in groups 510 and 514, is shown.

Figure 7B:
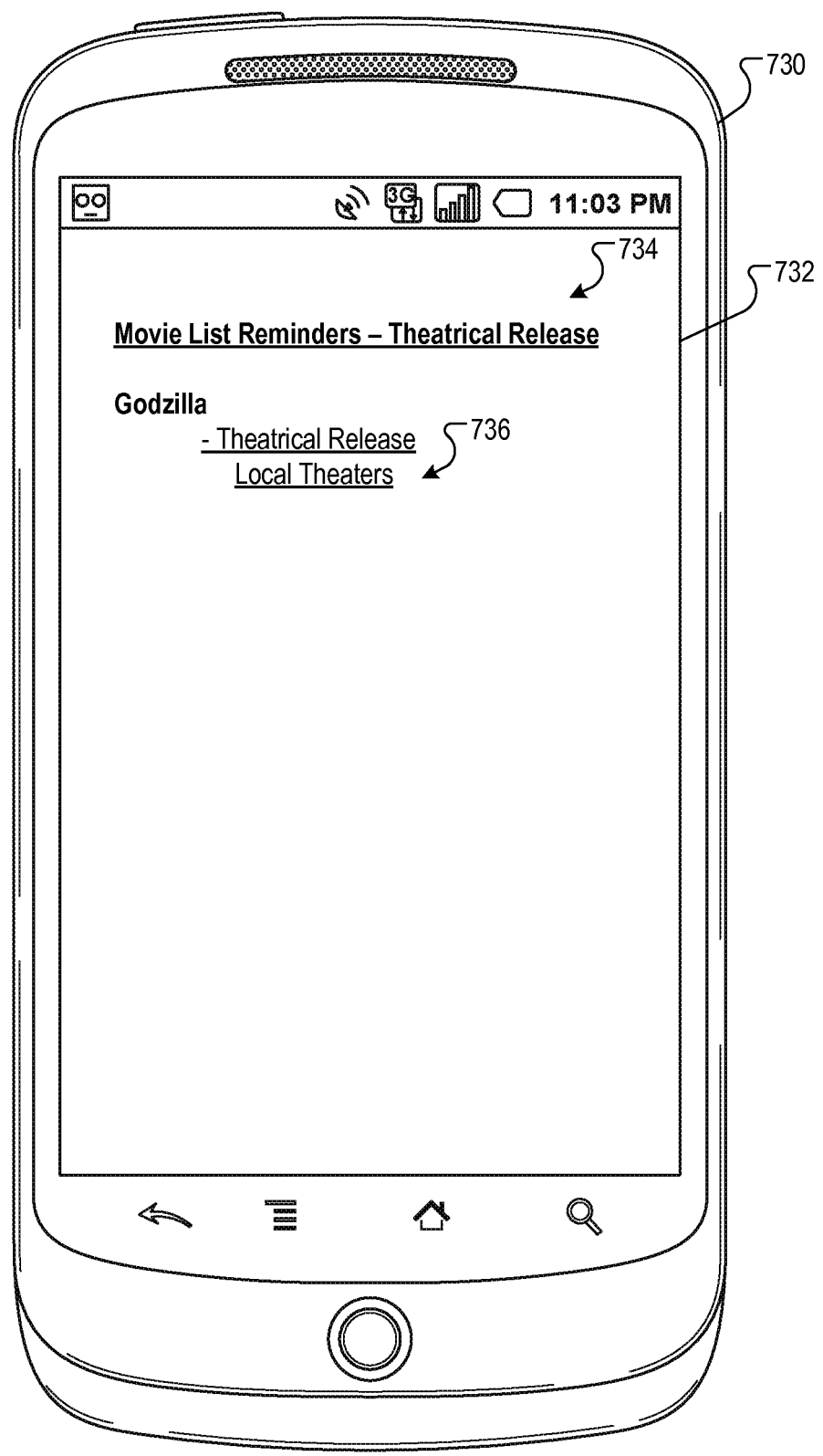
FIG. 7B is an illustration of a user interface at a user device in which a list of items in response to the triggering of a reminder event for a second reminder type is displayed.

Likewise, with reference to FIG. 7B, the theatrical release date for the movie Godzilla has occurred. Accordingly, a reminder 734 for the movie Godzilla is shown. In some implementations, additional information pertinent to the reminder may be provided. For example, a list of theaters in which the movie is playing may be shown by selecting the link 736.

In addition to "when" and "where" type reminders, other reminder types can also be implemented. For example, as described above, reminders may be "one time" or "recurring" type reminders. Reminders may also be "deadline" type reminders that monitor for the fulfillment of a list item and only remind the user if the list item is not fulfilled by the deadline time. In a variation of these implementations, deadline reminders may periodically remind the user prior to the deadline, such as a daily reminder for an item on a list, along with a number of days until the deadline.

Reminders may also be behavioral type reminders. For example, a reminder may be of the "On the way to . . . " type reminder, and will trigger when a user is on the way to a "where" location. For example, a user may request directions to a movie theater, and when the directions are provided a list of movie reminders may also be provided.

Reminders may also be combined, such as by Boolean operators, e.g., "When" AND "Where," "When" OR "Where," etc.

Reminders may also be clustered according to their respective categories. For examples, reminders related to the categories of groceries and hardware may be grouped into an "errand" type category, as users usually consider shopping at grocery stores and hardware stores as necessities. Conversely, reminders related to the categories of movies, televisions, sporting events, etc., may be grouped into an "entertainment" type category, as such events are typically considered entertainment. A user may thus utter "Show me the errands I need to do today," and the reminder processor 124 will cause the user device to present reminders for categories that belong to the particular category cluster.

In some implementations, reminders may be qualitative events instead of quantifiable events. For example, a user may utter [do laundry when I have free time]. The reminder processor 124 may again use language models to determine a constraint from the terms "when I have free time." The constraint may then be expressed according to one or more predefined criteria for the constraint type. For example, for the constraint "Free Time," the criteria may be 1) outside of normal working hours; 2) when home; and 3) not within one hour of any other appointment on a user calendar. When these criteria are met, the reminder to "do laundry" will be generated.

In some implementations, reminders items may be linked to other items on a reminder list. For example, a user may utter [call my wife when grocery shopping]. The reminder processor will then add a reminder—Call wife—to the grocery item list with a corresponding "where" type of "At Grocery Store" even though the item "Call wife" is not a grocery item. Thus, when the reminder type of "At Grocery Store" is satisfied, a reminder to "Call wife" will also be shown.

In some implementations, reminder lists may be shared among users. For example, two people may share a grocery item list, and as each person adds items to the list during the week the list is updated for each person. Thus, when an event occurs that satisfies the reminders on the list, the list is shown on the user device. In variations of these implementations, a notification that the reminder was triggered may be provided to other users sharing the list. For example, a husband may receive a notification "Your wife is now shopping at Mom's Grocery Store, and she has been reminded to purchase the following items on the grocery list," along with the list of items for which the reminder was triggered.

Although the example reminder types for "Grocery" and "Movies" categories have been described, other reminder types for other categories can be used. For example, for a television type reminder, reminder types can be a "When" type, subject to a "Lead Time", e.g., one hour before a program begins, and a "Repeat" type, subject to the airing of each episode. For reminders related to syndicated programs, the reminders may also be of a "Channel" type, subject to a station on which the syndicated program airs.

Reminders for other subject matter areas, such as Books, Music, Work, Professional Organizations, etc. can also be used.

While the example lists described above are generated in response to a user input, lists and reminders may also be generated based on observed user behavior. For example, a user history of reminder creation and completion can be used to determine the correct reminder item and the corresponding trigger as a suggested reminder. Other information, such as a user location, whether a user deletes a reminder before the reminder is triggered, etc., may also be used to determine reminders to suggest to the user or to automatically set for the user. For example, a user may infrequently enter a particular reminder, e.g., "Go to gym," but then clear the reminder before the reminder is triggered. Because the observed behavior is that that user may not consider the particular reminder important, the system learns that the reminder should not be automatically set for the user, or even suggested to the user.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 8:
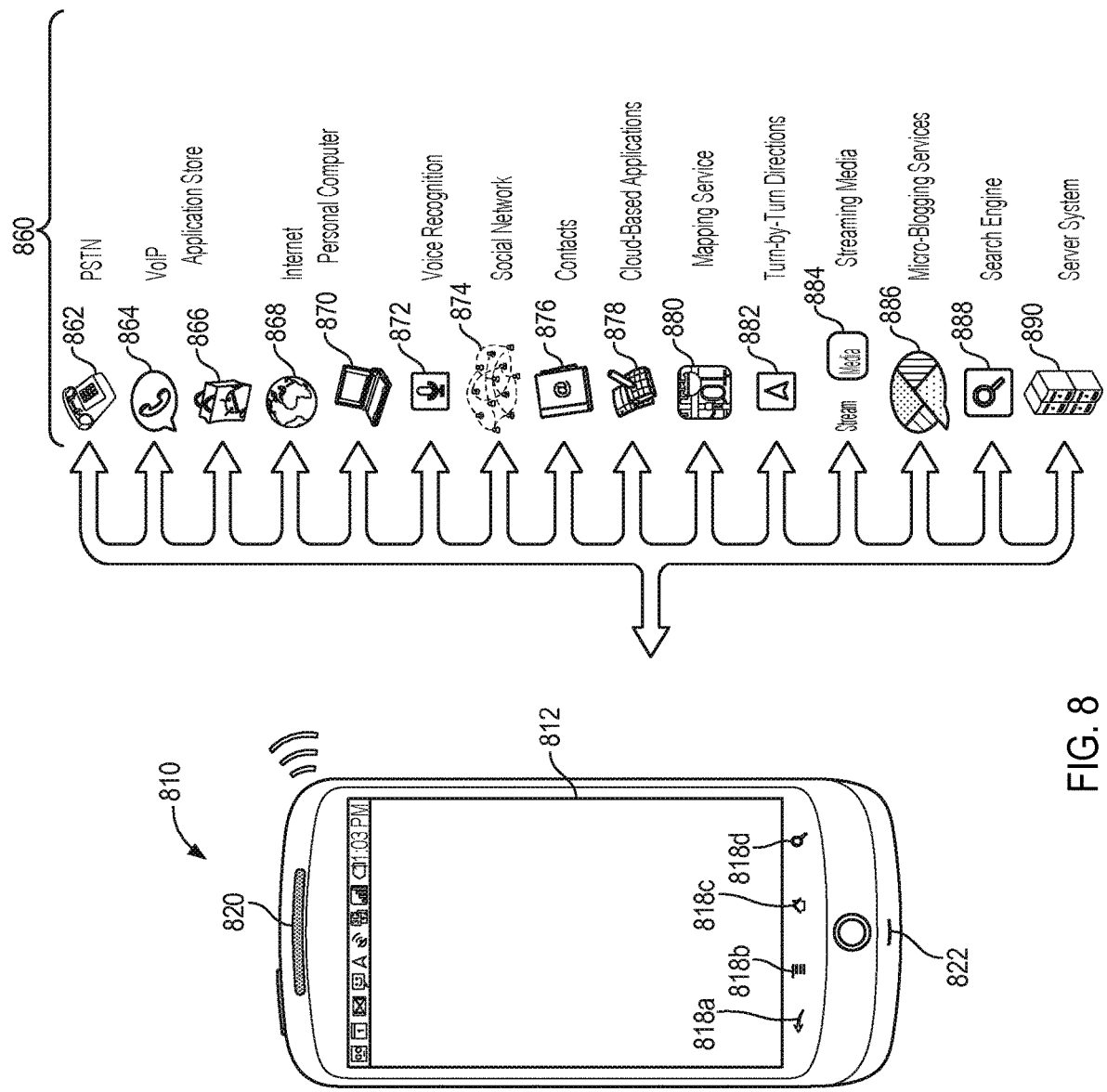
FIG. 8 is a block diagram of an example mobile computing device.

FIG. 8 is a block diagram of example mobile computing device. In this illustration, the mobile computing device 810 is depicted as a handheld mobile telephone (e.g., a smartphone, or an application telephone) that includes a touchscreen display device 812 for presenting content to a user of the mobile computing device 810 and receiving touch-based user inputs. Other visual, tactile, and auditory output components may also be provided (e.g., LED lights, a vibrating mechanism for tactile output, or a speaker for providing tonal, voice-generated, or recorded output), as may various different input components.

Example visual output mechanism in the form of display device 812 may take the form of a display with resistive or capacitive touch capabilities. The display device may be for displaying video, graphics, images, and text, and for coordinating user touch input locations with the location of displayed information so that the device 810 can associate user contact at a location of a displayed item with the item. The mobile computing device 810 may also take alternative forms, including as a laptop computer, a tablet or slate computer, a personal digital assistant, an embedded system (e.g., a car navigation system), a desktop personal computer, or a computerized workstation.

The mobile computing device 810 may be able to determine a position of physical contact with the touchscreen display device 812 (e.g., a position of contact by a finger or a stylus). Using the touchscreen 812, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 812 that corresponds to each key.

The mobile computing device 810 may include mechanical or touch sensitive buttons 818a-d. Additionally, the mobile computing device may include buttons for adjusting volume output by the one or more speakers 820, and a button for turning the mobile computing device on or off. A microphone 822 allows the mobile computing device 810 to convert audible sounds into an electrical signal that may be digitally encoded and stored in computer-readable memory, or transmitted to another computing device. The mobile computing device 810 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. The operating system may provide a platform for the execution of application programs that facilitate interaction between the computing device and a user.

The mobile computing device 810 may present a graphical user interface with the touchscreen 812. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. User-selection of the button may invoke the pre-defined action.

The mobile computing device 810 may include other applications, computing sub-systems, and hardware. A voice recognition service 872 may receive voice communication data received by the mobile computing device's microphone 822, and translate the voice communication into corresponding textual data or perform voice recognition. The processed voice data can be input to the command models stored in the command models data 122 to determine whether the voice input used to generate the voice data invokes a particular action for a particular application as described above. One or more of the applications, services and units below may have corresponding actions invoked by such voice commands.

A call handling unit may receive an indication of an incoming telephone call and provide a user the capability to answer the incoming telephone call. A media player may allow a user to listen to music or play movies that are stored in local memory of the mobile computing device 810. The mobile device 810 may include a digital camera sensor, and corresponding image and video capture and editing software. An internet browser may enable the user to view content from a web page by typing in an addresses corresponding to the web page or selecting a link to the web page.

A service provider that operates the network of base stations may connect the mobile computing device 810 to the network 850 to enable communication between the mobile computing device 810 and other computing systems that provide services 860. Although the services 860 may be provided over different networks (e.g., the service provider's internal network, the Public Switched Telephone Network, and the Internet), network 850 is illustrated as a single network. The service provider may operate a server system 852 that routes information packets and voice data between the mobile computing device 810 and computing systems associated with the services 860.

The network 850 may connect the mobile computing device 810 to the Public Switched Telephone Network (PSTN) 862 in order to establish voice or fax communication between the mobile computing device 810 and another computing device. For example, the service provider server system 852 may receive an indication from the PSTN 862 of an incoming call for the mobile computing device 810. Conversely, the mobile computing device 810 may send a communication to the service provider server system 852 initiating a telephone call using a telephone number that is associated with a device accessible through the PSTN 862.

The network 850 may connect the mobile computing device 810 with a Voice over Internet Protocol (VoIP) service 864 that routes voice communications over an IP network, as opposed to the PSTN. For example, a user of the mobile computing device 810 may invoke a VoIP application and initiate a call using the program. The service provider server system 852 may forward voice data from the call to a VoIP service, which may route the call over the internet to a corresponding computing device, potentially using the PSTN for a final leg of the connection.

An application store 866 may provide a user of the mobile computing device 810 the ability to browse a list of remotely stored application programs that the user may download over the network 850 and install on the mobile computing device 810. The application store 866 may serve as a repository of applications developed by third-party application developers. An application program that is installed on the mobile computing device 810 may be able to communicate over the network 850 with server systems that are designated for the application program. For example, a VoIP application program may be downloaded from the Application Store 866, enabling the user to communicate with the VoIP service 864.

The mobile computing device 810 may access content on the internet 868 through network 850. For example, a user of the mobile computing device 810 may invoke a web browser application that requests data from remote computing devices that are accessible at designated universal resource locations. In various examples, some of the services 860 are accessible over the internet.

The mobile computing device may communicate with a personal computer 870. For example, the personal computer 870 may be the home computer for a user of the mobile computing device 810. Thus, the user may be able to stream media from his personal computer 870. The user may also view the file structure of his personal computer 870, and transmit selected documents between the computerized devices.

The mobile computing device 810 may communicate with a social network 874. The social network may include numerous members, some of which have agreed to be related as acquaintances. Application programs on the mobile computing device 810 may access the social network 874 to retrieve information based on the acquaintances of the user of the mobile computing device. For example, an "address book" application program may retrieve telephone numbers for the user's acquaintances. In various examples, content may be delivered to the mobile computing device 810 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 810 may access a personal set of contacts 876 through network 850. Each contact may identify an individual and include information about that individual (e.g., a phone number, an email address, and a birthday). Because the set of contacts is hosted remotely to the mobile computing device 810, the user may access and maintain the contacts 876 across several devices as a common set of contacts.

The mobile computing device 810 may access cloud-based application programs 878. Cloud-computing provides application programs (e.g., a word processor or an email program) that are hosted remotely from the mobile computing device 810, and may be accessed by the device 810 using a web browser or a dedicated program.

Mapping service 880 can provide the mobile computing device 810 with street maps, route planning information, and satellite images. The mapping service 880 may also receive queries and return location-specific results. For example, the mobile computing device 810 may send an estimated location of the mobile computing device and a user-entered query for "pizza places" to the mapping service 880. The mapping service 880 may return a street map with "markers" superimposed on the map that identify geographical locations of nearby "pizza places."

Turn-by-turn service 882 may provide the mobile computing device 810 with turn-by-turn directions to a user-supplied destination. For example, the turn-by-turn service 882 may stream to device 810 a street-level view of an estimated location of the device, along with data for providing audio commands and superimposing arrows that direct a user of the device 810 to the destination.

Various forms of streaming media 884 may be requested by the mobile computing device 810. For example, computing device 810 may request a stream for a pre-recorded video file, a live television program, or a live radio program.

A micro-blogging service 886 may receive from the mobile computing device 810 a user-input post that does not identify recipients of the post. The micro-blogging service 886 may disseminate the post to other members of the micro-blogging service 886 that agreed to subscribe to the user.

A search engine 888 may receive user-entered textual or verbal queries from the mobile computing device 810, determine a set of internet-accessible documents that are responsive to the query, and provide to the device 810 information to display a list of search results for the responsive documents. In examples where a verbal query is received, the voice recognition service 872 may translate the received audio into a textual query that is sent to the search engine.

These and other services may be implemented in a server system 890. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus, the method comprising:

receiving, at a data processing apparatus, a first input comprising a plurality of terms;

determining, by the data processing apparatus, that one or more of the terms in the first input specify an item that belongs to a reminder category, the reminder category being associated with a collection of items that belong to the reminder category and for which reminders may be generated, the determining comprising:

accessing a plurality of reminder category dictionaries, wherein each reminder category dictionary:

corresponds to an associated reminder category and is different from each of the other reminder categories represented in the plurality of reminder category dictionaries;

stores terms describing items that belong to the associated reminder category; and specifies reminder types that belong to the associated reminder category, wherein each reminder type:

is associated with one or more of the items that belong to the associated reminder category; and specifies a default triggering event specific to the reminder type and that is different from default triggering events of each other reminder type;

determining that the item specified in the first input is an item listed in a particular reminder category dictionary of the plurality of reminder category dictionaries; and in response to the determination:

automatically selecting, by the data processing apparatus one of the reminder types in the particular reminder category dictionary;

providing, by the data processing apparatus and to a user device, data to be used to present a list of one or more options each associated with an alternative triggering event, wherein each alternative triggering event:

is an alternative to the default triggering event of the selected reminder type, and is different from each other triggering event of the selected reminder type; and storing data that associates the triggering event of the selected reminder type with the item specified by the one or more terms.

2. The computer-implemented method of claim 1, further comprising:
receiving a selection of one of the options associated with an alternative triggering event,
wherein the storing the data that associates a triggering event of the selected reminder type with the item specified by the one or more terms comprises storing data that associates the alternative triggering event associated with the selected option with the item specified by the one or more terms.

3. The computer-implemented method of claim 1, further comprising:
receiving a second input comprising a plurality of terms;
determining that one or more of the terms in the second input specify an action to process an item list that belongs to the reminder category, the item list being a collection of one or more items associated with a reminder type corresponding to a selected option of the one or more options; and
providing data that causes the user device to present the item list of the one or more items.

4. The computer-implemented method of claim 3, wherein determining that one or more of the terms in the second input specify an action to process an item list that belongs to the reminder category comprises:
parsing the plurality of terms of the second input to generate parsed terms;
comparing the parsed terms of the second input to the plurality of reminder category dictionaries; and
selecting one of the reminder categories based on a match of the one or more terms in the second input to terms in the reminder category dictionary corresponding to the selected reminder category.

5. The computer-implemented method of claim 4, wherein:
determining that one or more of the terms in the second input specify an action to process an item list that belongs to the reminder category comprises determining that parsed terms of the second input specify a first reminder type; and
providing data that causes the user device to present the item list of the one or more items comprises providing data that causes the user device to present the item list of the one or more items where each of the one or more items is associated with the first reminder type.

6. The computer-implemented method of claim 5, wherein:
determining that one or more of the terms in the second input specify an action to process an item list that belongs to the reminder category comprises determining that parsed terms of the second input specify a second reminder type; and
providing data that causes the user device to present the item list of the one or more items comprises providing data that causes the user device to present the item list of the one or more items where each of the one or more items is not associated with the second reminder type.

7. The computer-implemented method of claim 1, further comprising:
determining that an event that triggers the reminder type has occurred; and
in response to the determination, providing data that causes the user device to present a reminder and a list that includes the item.

8. The computer-implemented method of claim 7, wherein the event is one of either occurrence of a predefined time or presence of the user device at a location.

9. The computer-implemented method of claim 1, further comprising:
receiving a second input comprising a plurality of terms;
determining that one or more of the terms in the second input specify an action to process an item list that lists reminders for items associated with a particular reminder type; and
providing data that causes the user device to present the item list of the reminders for the items.

10. A system, comprising:
a data processing apparatus; and
a computer storage medium encoded with a computer program, the program comprising instructions that when executed by the data processing apparatus cause the data processing apparatus to perform operations comprising:
receiving a first input comprising a plurality of terms;
determining that one or more of the terms in the first input specify an item that belongs to a reminder category, the reminder category being associated with a collection of items that belong to the reminder category and for which reminders may be generated, the determining comprising:
accessing a plurality of reminder category dictionaries, wherein each reminder category dictionary:
corresponds to an associated reminder category and is different from each of the other reminder categories represented in the plurality of reminder category dictionaries;
stores terms describing items that belong to the associated reminder category; and
specifies reminder types that belong to the associated reminder category, wherein each reminder type:
is associated with one or more of the items that belong to the associated reminder category; and
specifies a default triggering event specific to the reminder type and that is different from default triggering events of each other reminder type;
determining that the item specified in the first input is an item listed in a particular reminder category dictionary of the plurality of reminder category dictionaries; and
in response to the determination:
automatically selecting, by the data processing apparatus, one of the reminder types in the particular reminder category dictionary;
providing, by the data processing apparatus and to a user device, data to be used to present a list of one or more options each associated with an alternative triggering event, wherein each alternative triggering event:
is an alternative to the default triggering event of the selected reminder type, and
is different from each other triggering event of the selected reminder type; and
storing data that associates the triggering event of the selected reminder type with the item specified by the one or more terms.

11. The system of claim 10, further comprising:
receiving a selection of one of the options associated with an alternative triggering event,
wherein the storing the data that associates a triggering event of the selected reminder type with the item specified by the one or more terms comprises storing data that associates the alternative triggering event associated with the selected option with the item specified by the one or more terms.

12. The system of claim 10, the operations further comprising:
  receiving a second input comprising a plurality of terms;
  determining that one or more of the terms in the second input specify an action to process an item list that belongs to the reminder category, the item list being a collection of one or more items associated with a reminder type corresponding to a selected option of the one or more options; and
  providing data that causes the user device to present the item list of the one or more items.

13. The system of claim 12, wherein determining that one or more of the terms in the second input specify an action to process an item list that belongs to the reminder category comprises:
  parsing the plurality of terms of the second input to generate parsed terms;
  comparing the parsed terms of the second input to the plurality of reminder category dictionaries; and
  selecting one of the reminder categories based on a match of the one or more terms in the second input to terms in the reminder category dictionary corresponding to the selected reminder category.

14. The system of claim 13, wherein:
  determining that one or more of the terms in the second input specify an action to process an item list that belongs to the reminder category comprises determining that parsed terms of the second input specify a first reminder type; and
  providing data that causes the user device to present the item list of the one or more items comprises providing data that causes the user device to present the item list of the one or more items where each of the one or more items is associated with the first reminder type.

15. A computer storage medium encoded with a computer program, the program comprising instructions that when executed by data processing apparatus cause the data processing apparatus to perform operations comprising:
  receiving a first input comprising a plurality of terms;
  determining that one or more of the terms in the first input specify an item that belongs to a reminder category, the reminder category being associated with a collection of items that belong to the reminder category and for which reminders may be generated, the determining comprising:
  accessing a plurality of reminder category dictionaries, wherein each reminder category dictionary:
    corresponds to an associated reminder category and is different from each of the other reminder categories represented in the plurality of reminder category dictionaries;
    stores terms describing items that belong to the associated reminder category; and
    specifies reminder types that belong to the associated reminder category, wherein each reminder type:
      is associated with one or more of the items that belong to the associated reminder category; and
      specifies a default triggering event specific to the reminder type and that is different from default triggering events of each other reminder type;
  determining that the item specified in the first input is an item listed in a particular reminder category dictionary of the plurality of reminder category dictionaries; and
  in response to the determination:
    automatically selecting, by the data processing apparatus, one of the reminder types in the particular reminder category dictionary;
    providing, by the data processing apparatus and to a user device, data to be used to present a list of one or more options each associated with an alternative triggering event, wherein each alternative triggering event;
      is an alternative to the default triggering event of the selected reminder type, and
      is different from each other triggering event of the selected reminder type; and
    storing data that associates the trigger event of the selected reminder type with the item specified by the one or more terms.

* * * * *